United States Patent [19]

Combronde

[11] 4,276,254

[45] Jun. 30, 1981

[54] PROCESS AND MOLD FOR PRODUCING SAFETY FOOTWEAR

[75] Inventor: Roger Combronde, Chabreloche, France

[73] Assignee: Plastic Auvergne, Chabreloche, France

[21] Appl. No.: 103,139

[22] Filed: Dec. 13, 1979

[30] Foreign Application Priority Data

Dec. 22, 1978 [FR] France ............................. 78 36261

[51] Int. Cl.³ ..................... B29D 3/02; B32B 15/08
[52] U.S. Cl. ................................. 264/251; 264/244; 264/254; 264/278; 425/111; 425/112; 425/129 S
[58] Field of Search ............... 264/244, 251, 254, 278; 425/119, 129 S, 111, 112

[56] References Cited

U.S. PATENT DOCUMENTS

| 3,009,204 | 11/1961 | Bingham, Jr. et al. | 425/119 |
| 3,109,701 | 11/1963 | Jacquet | 264/244 |
| 3,305,895 | 2/1967 | Ludwig | 425/129 S |
| 3,327,412 | 6/1967 | Wilmanns et al. | 264/244 |
| 3,446,887 | 5/1969 | Ludwig | 264/244 |
| 3,510,912 | 5/1970 | Lane | 425/129 S |
| 3,577,503 | 5/1971 | Innocenti | 264/244 |
| 3,671,621 | 6/1972 | Fukuoka | 264/244 |
| 3,682,579 | 8/1972 | Hujik | 425/129 S |
| 4,120,477 | 10/1978 | Justamante | 264/244 |

FOREIGN PATENT DOCUMENTS 2281039  3/1976  France ...................................... 425/119

Primary Examiner—James B Lowe
Attorney, Agent, or Firm—Michael F. Petock

[57] ABSTRACT

The process and mold are specially adapted to produce safety footwear for professional use and in particular for persons working on building sites, these articles being obtained by injection molding. The process comprises previously coating the metal sole with adhesive on both sides and fixing it on the mold slab corresponding to the first injection at a distance from the last so as to form between the mold cavity of the slab and the last a gap corresponding to the thickness of the insole produced by the first injection. Thereafter, the slab is removed and there is brought in front of the visible face of the metal sole the second slab for injecting the outsole which will cover the face of the metal sole.

9 Claims, 4 Drawing Figures

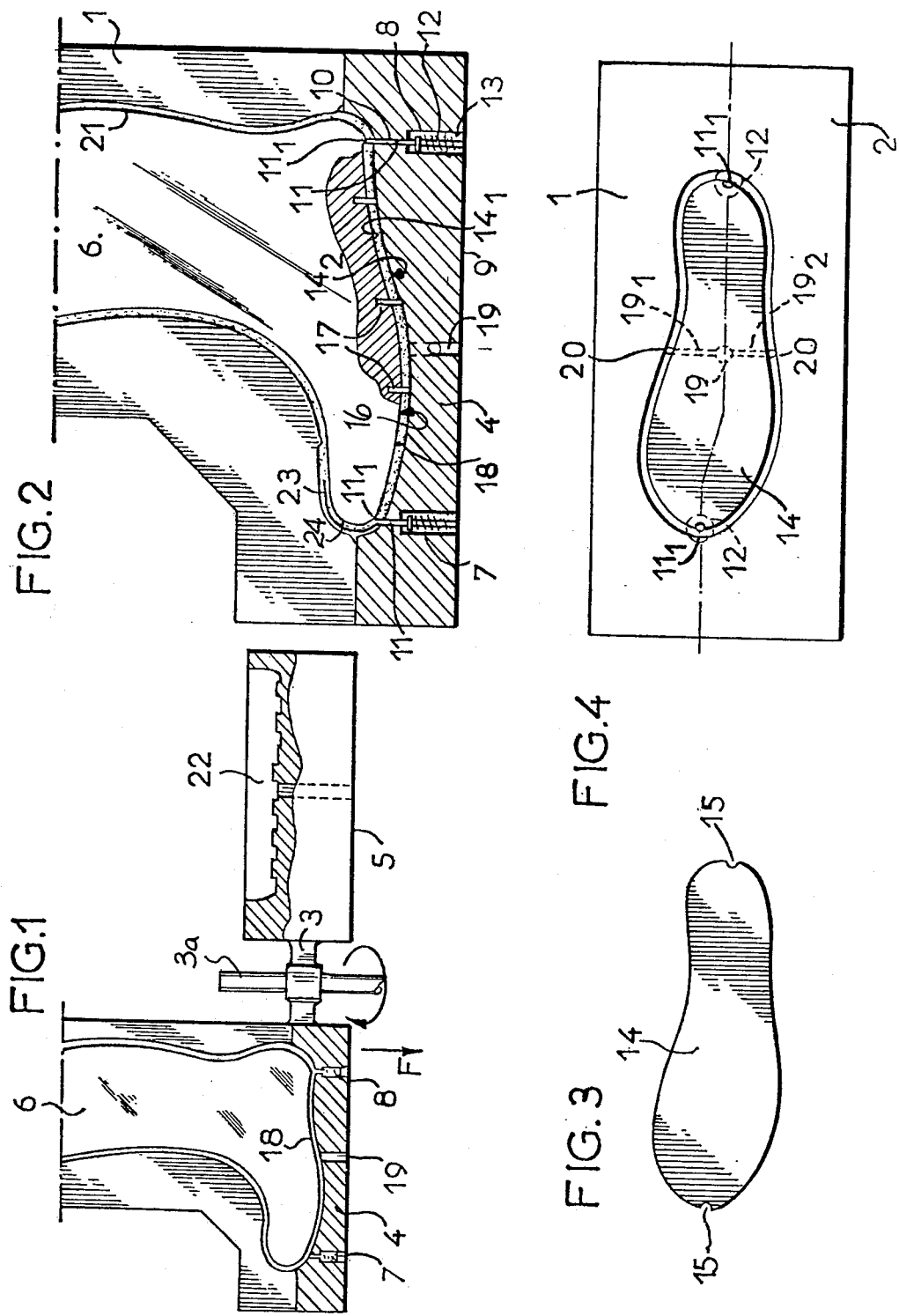

PROCESS AND MOLD FOR PRODUCING SAFETY FOOTWEAR

The invention relates to a process and mould specially adapted for producing safety footwear for professional use and in particular for persons on building sites, these articles being obtained by injection moulding.

Injection moulding in a single colour or "bi-colour" moulding is well known in the shoe art. Also, safety footwear comprising metal reinforcements in the region of the toe of the shoe and the sole have been known for a long time. However, the methods usually employed for assembling the metal sole with the rest of the shoe have not permitted up to the present time the obtainment of protecting soles which are directly embedded in the injected material, the soles being usually covered on their upper side with a layer of foam and being placed on the metal last so as to be merely covered with the injected material on their lower side facing the outsole or wear sole.

According to this known method, there is first taken a mould formed by two openable parts corresponding to the injection of the leg portion of the footwear and a rotary plate having a double "slab" or mould base (if successive injections are made) and a heated metal last or boot-tree which is clad prior to the injecting operation with a lining (sock). It is on this lining that the side of the metal sole covered with foam is positioned before closing the mould and effecting the first injection. In this method, the metal sole is not maintained exactly in position during the injecting operation so that there may be a sliding of the sole caused by the thrust of the injecting material which adversely affects its centering relative to the edges of the last. Further, and as mentioned before, the protecting sole is not completely covered with the injecting material but merely covered on one of its sides.

The main object of the invention is to overcome these drawbacks by means of an improved process and mould which ensure an excellent centering and positioning of the protecting sole in at once the longitudinal, transverse and vertical directions, this process permitting an advantage to be taken of this exact fixing of the sole relative to the mould elements (opening parts, last and base) so as to cover it on both sides with the injecting material or materials.

Consequently, according to the invention there is provided a process for producing at least by two successive injections, safety footwear, such as boots, clogs, ankle boots or the like, of the type comprising at least one metal sole which may be if desired completed by a protecting shell in the region of the toe end, wherein the metal sole is embedded in the injecting material by coating both its sides in the course of the two successive injections.

According to an advantageous manner of proceeding (using an injection mould provided with two openable parts, a double slab base and a last), this process is characterized in that the metal sole is fixed on the slab of the mould, corresponding to the first injection, by maintaining it at a distance from the last so as to provide between the mould cavity of this slab and said last a gap corresponding to the thickness of the insole produced in the course of the first injection and thereafter this slab is removed from the mould and the second slab is brought into facing relation to the visible side of the metal sole for the injection of the outsole which will cover this side of the metal sole.

The invention also provides an improved mould for carrying out the process according to the invention, wherein the slab corresponding to the first injection comprises at least two withdrawable finger members which project into its mould cavity, the metal sole comprising at least two notches located at two opposed points of its periphery, the distance between the finger members being slightly less than that between the two notches of the metal sole so that the latter is set and positioned on the slab owing to its own elasticity by the engagement of the finger members in the notches.

Of course, the invention covers safety footwear, such as boots, clogs, ankle boots or like articles obtained by means of the process and mould according to the invention.

Further features and advantages will be apparent from the ensuing description and the accompanying drawings in which:

FIG. 1 is a diagrammatic view illustrating the component parts of the injection mould;

FIG. 2 is a longitudinal sectional view of the slab corresponding to the first injection;

FIG. 3 is a plan view of the metal sole;

FIG. 4 is a diagrammatic top view of the metal sole which is positioned relative to the slab shown in FIG. 2.

The invention essentially resides in a process which enables a metal protecting sole of sheet spring steel to be embedded in the injecting material, this sole being exactly positioned and maintained during the injection operation so as to be perfectly centered in the longitudinal and transverse plane relative to the quarters of the last that is to say relative to the periphery of the outsole.

This process employs a conventional mould consisting of two openable parts 1 and 2 (FIG. 4) corresponding to the leg portion of the footwear and a closing element 3 (FIG. 1) carrying two mould bases or "slabs" 4 and 5 in particular in the case of the production of a "bi-colour" article from two successive injections. This mould further comprises a conventional metal last 6 which is preferably heated, this last defining, relative to the lateral parts of the mould and relative to the bases, the mould cavity corresponding to the leg portion and the sole of the footwear.

According to the invention, only the slab or mould base 4 corresponding to the first injection and the metal last 6 have been improved for carrying out the process in question. In this respect, this slab 4 comprises two recesses 7 and 8 which are oriented in a plane perpendicular to its horizontal plane 9, these recesses being cylindrical and extended by bores 10 which open onto the mould cavity. These recesses 7 and 8 serve to house positioning finger members or abutments 11 which are withdrawably mounted on elastic return means 12 which are concentric with the finger members 11, these elastic return means being for example springs which are held stationary in the recesses 7 and 8 by lock nuts 13. These springs have for purpose to bias the finger members 11 outwardly of the slab toward the rest of the mould cavity so that their end portions $11_1$ always project into said mould cavity.

The metal protecting sole 14 is set, i.e. is positioned relative to the slab 4 (FIG. 3), by engaging said sole on the finger members 11, this sole having for this purpose two notches 15 which are located at two opposed points of its periphery and receive the upper end portions $11_1$ of the finger members 11. In order to achieve an exact engagement which precludes any displacement of the metal sole in the course of the injection, it is arranged that the distance between the two finger members 11 be slightly less than the distance between the bottoms of the two notches 15 of the sole, and the elasticity of the steel sole is used to obtain a veritable locking of said sole on the finger members 11 which is achieved by a slight transverse bending of the sole 14 for bringing the finger members 11 into the two notches 15. When the protecting sole is released, the sole tends to straighten and lengthen owing to its flexibility and becomes wedged against the positioning finger members 11.

In order to coat the metal sole with the injecting material or materials, said sole is maintained applied against the slab 4 at a distance from the lower face 16 of the last 6. This is achieved by spacer means or pins 17, three in number in the presently-described embodiment, these pins being a force fit in the lower face 16 of the last but projecting into the mould cavity to an extent equal to the thickness of the first injection which will mould the insole 18 and cover the upper face $14_1$ of the metal sole. These pins consequently maintain the metal sole applied against the slab 4, and above all maintain a constant gap throughout the length of the foot between this sole and the last, so that the injecting material filling the cavity defined between this sole and the last will have a constant thickness. The end portions $11_1$ of the positioning finger members 11 project into the mould cavity to an extent equal to the projection of the pins 17 owing to the fact that these finger members are elastically mounted and are necessarily urged back when they come in contact with the last 6 when the mould is closed.

When the metal sole is correctly positioned in this way, the mould is closed and this corresponds to the contacting of the upper face $14_1$ of this sole with the spacer pins 17 and the contacting of the finger members 11 with the lower face 16 of the last 6. Under these conditions, the first injection is carried out by way of the injection passageway 19 which is located substantially in the longitudinal and transverse median planes of the mould (see FIG. 4) and is divided in its upper part into two branches $19_1$ and $19_2$ which substantially open onto the region of the periphery of the metal sole, that is to say at 20. The material injected by way of this passageway 19 is distributed in the gap corresponding to the leg portion 21 of the footwear and in the space defined by the projecting parts of the pins 17 and the finger members 11 so as to form the insole 18.

After cooling, the slab 4 is withdrawn from the mould in the direction of arrow F (FIG. 1) and then the rotary element 3 is swung through 180° about the shaft 3a so as to bring the second injection slab or mould base 5 in front of the mould, after which it is moved upwardly to the moulding position thereof. This this second slab has a mould cavity 22 corresponding to the injection of the outsole. No detail of this second moulding slab 5 is given since it concerns a conventional mould part.

The process and mould according to the invention consequently produce safety footwear comprising a metal protecting sole embedded between the two injecting materials, the first injection producing the insole 18, the second covering the lower face $14_2$ of the metal sole when forming the outsole. Further, the presence of the spacer pins 17 and the positioning finger members 11 ensures an exact centering and maintenance of the position of the metal sole 14 during the two moulding operations so that this sole is transversely and longitudinally exactly centered in the injected material and all the material thicknesses are highly regular from one footwear article to another.

Further, this process and mould also avoid possible errors owing to an incorrect matching of metal soles and last sizes inasmuch as said soles must engage around the positioning finger members 11. Of course, the protecting sole 14 may be completed, if required, with a protecting shell 23 which is located in the region of the toe end, possibly with a connecting plate 24 connecting the shell 23 to the protecting sole 14.

The main advantage in having a metal protecting sole which is coated, that is to say embedded in the injecting material, is the avoidance of the risk of this protecting sole coming away from the injected material or of the shearing effects of the sole in the material. The connection between the metal protecting sole and the injected material may of course be facilitated by a prior addition of adhesive on both sides of the metal sole 14.

I claim:

1. In a process for the injection moulding of safety footwear with the inclusion of a sheet metal sole embedded in an injected sole portion of the footwear, by means of an inner last, two openable lateral mould parts, a first mould base, a second mould base and means for bringing alternately the first mould base and the second mould base into a moulding position relative to the last and the two lateral mould parts for injection moulding the footwear said two lateral mould parts and first mould base and second mould base having mould cavities which define with the last a space for receiving a moulding material, said process comprising inserting said sheet metal sole between an inner sole and an outer sole of the footwear; the improvement comprising the steps of:

forming abutment means in the mould cavity of the first mould base adjacent two ends of the mould cavity of the first mould corresponding to toe and heel ends of the footwear, the abutment means having sheet metal sole engaging surfaces which have given shapes and are spaced a given distance apart;

taking a sheet metal sole having resilience and defining two abutment means engaging surfaces of given shapes at opposite ends of the sheet metal sole which surfaces are spaced apart a distance sufficiently greater than said given distance whereby a slight resilient bending of the sheet metal sole is necessary in order to engage the sheet metal sole between the abutment means, said given shapes of the abutment means and the abutment means engaging surfaces being respectively such as to interlock transversely of the sheet metal sole;

placing the sheet metal sole in the mould cavity of the first mould base and wedging the sheet metal sole between the abutment means by suitably bending the sheet metal sole so as to maintain the sheet metal sole in correct position against the bottom of the mould cavity of the first mould base by the effect of said wedging and said interlocking;

bringing the first mould base into the moulding position thereof and effecting a first injection moulding by injecting moulding material into said space and between the last and the sheet metal sole and thereby moulding an inner sole;

allowing the moulding material to substantially set;

removing the first mould base from the sheet metal sole, which sheet metal sole remains adhered to the moulding material injected into said space and has a bare surface exposed;

bringing the second mould base into the moulding positions thereof and effecting a second injection moulding by injecting moulding material into the mould cavity of the second mould base between the second mould base and said bare surface of the sheet metal sole and thereby moulding an outer sole; and removing the second mould base after the moulding material has substantially set.

2. A process as claimed in claim 1, further comprising providing spacer means mounted on the last and extending from the last toward the bottom of the mould cavity of the first mould base a distance sufficient to maintain a part of the sheet metal sole which is intermediate said abutment means engaging surfaces applied against the bottom of the mould cavity of the first mould base during the injection, said spacer means being operative to support the sheet metal sole when effecting said second injection.

3. A process as claimed in claim 1 or 2, wherein the abutment means comprise a pin located adjacent each of said two ends of the mould cavity of the first mould base and slidably mounted in the first mould base, spring means being provided for biasing the pins to a position in which the pins extend from the bottom of the mould cavity of the first mould base to an extent exceeding the space for receiving the moulding material and are thereby thrust partly into the first mould base by the last while remaining in contact with the sheet metal sole when the first mould base is brought to the moulding position thereof.

4. A process as claimed in claim 1 or 2, further comprising embedding a protecting shell between toe end portions of the last and the two lateral mould parts by connecting said protecting shell with the sheet metal sole prior to the injection moulding.

5. An injection mould for producing by at least two successive injections a safety footwear with inclusion of a resilient sheet metal sole embedded in an injected sole portion of the footwear, said mould comprising an inner last, two openable lateral mould parts, a first mould base, a second mould base and means for bringing alternately the first mould base and the second mould base into a moulding position relative to the last and the two lateral mould parts for injection moulding the footwear, said lateral mould parts, said first mould base and second mould base having mould cavities which define with the last a space for receiving a moulding material, two finger members respectively slidably mounted in the mould cavity of the first mould base adjacent two opposed ends of the mould cavity of the first mould base corresponding to toe and heel ends of the footwear for engaging notches in opposed ends of the sheet metal sole and thereby locating the sheet metal sole longitudinally and transversely of the mould cavity of the first mould base, said finger members being spaced apart a distance less than the distance between said notches in the sheet metal sole so as to require light bending of the sheet metal sole in order to engage the sheet metal sole between the finger members whereby the sheet metal sole is frictionally retained by the finger members owing to the resilience of the sheet metal sole, and elastically yieldable means biasing the finger members outwardly of the first mould base, the finger members having such length as to be biased out of the mould cavity of the first mould base an extent exceeding the moulding material receiving space between the mould cavity of the first mould base and the last whereby when the first mould base is brought to the moulding position thereof the last urges the finger members inwardly of the first mould base and the finger members frictionally bias adjacent end portions of the sheet metal sole against the first mould base.

6. A mould as claimed in claim 5, wherein the last comprises in combination therewith at least one spacer pin which is fixed under a lower face of the last, said pin projecting to an extent sufficient to apply the sheet metal sole against the first mould base when the first mould base is brought to the moulding position thereof.

7. A mould as claimed in claim 6, comprising a plurality of said spacer pins.

8. A mould as claimed in claim 6 or 7, comprising an injection passageway located substantially in longitudinal and transverse median planes of said first mould base and extended by two symmetrical branch portions which open out onto both sides of the sheet metal sole.

9. A structure comprising in combination a sheet metal sole and an injection mould for producing by at least two successive injections a safety footwear with said sheet metal sole embedded in an injected sole portion of the footwear, said mould comprising an inner last, two openable lateral mould parts, a first mould base, a second mould base and means for bringing alternately the first mould base and the second mould base into a moulding position relative to the last and the two lateral mould parts for injection moulding the footwear, said lateral mould parts, said first mould base and second mould base having mould cavities which define with the last a space for receiving a moulding material two finger members respectively slidably mounted in the mould cavity of the first mould base adjacent two opposed ends of the mould cavity of the first mould base corresponding to toe and heel ends by the footwear engaging notches in opposed ends of the sheet metal sole and thereby locating the sheet metal sole longitudinally and transversely of the mould cavity of the first mould base, said finger members being spaced apart a distance less than the distance between said notches in the sheet metal sole before the sheet metal sole is engaged between the finger members so as to require a slight bending of the sheet metal sole in order to engage the sheet metal sole between the finger members whereby the sheet metal sole is frictionally retained by the finger members in a position adjoining a bottom surface of the mould cavity of the first mould base owing to the resilience of the sheet metal sole, and elastically yieldable means biasing the finger members outwardly of the first mould base, the finger members having such length as to be biased out of the mould cavity of the first mould base an extent exceeding the moulding material receiving space between the mould cavity of the first mould base and the last whereby when the first mould base is brought to the moulding position thereof the last urges the finger members inwardly of the first mould base and the finger members frictionally bias adjacent end portions of the sheet metal sole against the first mould base.

* * * * *